(12) United States Patent
Kim (10) Patent No.: US 9,369,199 B2
(45) Date of Patent: Jun. 14, 2016

(54) METHOD AND APPARATUS FOR DISCONTINUOUS RECEPTION IN MOBILE TERMINAL

(75) Inventor: Soeng-Hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 12/992,694

(22) PCT Filed: May 12, 2009

(86) PCT No.: PCT/KR2009/002493
§ 371 (c)(1),
(2), (4) Date: Dec. 8, 2010

(87) PCT Pub. No.: WO2009/139572
PCT Pub. Date: Nov. 19, 2009

(65) Prior Publication Data
US 2011/0164583 A1    Jul. 7, 2011

(30) Foreign Application Priority Data

May 16, 2008  (KR) ........................ 10-2008-0045328

(51) Int. Cl.
*G08C 17/00* (2006.01)
*H04B 7/26* (2006.01)

(52) U.S. Cl.
CPC ....................................... *H04B 7/26* (2013.01)

(58) Field of Classification Search
CPC ....... H04W 52/0209–52/0258; H04W 76/048; H04W 52/00
USPC .................. 370/310–350; 455/88, 230, 343.2
See application file for complete search history.

(56) References Cited

U.S. PATENT DOCUMENTS

| 2008/0132230 | A1  | 6/2008  | Marinier et al. |
| 2009/0073907 | A1* | 3/2009  | Cai ............................... 370/311 |
| 2009/0285141 | A1* | 11/2009 | Cai et al. ....................... 370/311 |

FOREIGN PATENT DOCUMENTS

WO    2006/114710 A2    11/2006

OTHER PUBLICATIONS

Suckchel Yang et al., An Adaptive Discontinuous Reception Mechanism Based on Extending Paging Indicator for Power Saving in UMTS, IEEE 64th Vehicular Technology Conference, Sep. 2006, pp. 1-5.

* cited by examiner

*Primary Examiner* — Andrew Chriss
*Assistant Examiner* — Kenan Cehic
(74) *Attorney, Agent, or Firm* — Jefferson IP Law, LLP (57) ABSTRACT

A method and apparatus for discontinuous reception (DRX) in a mobile terminal are disclosed. The discontinuous reception method includes: receiving DRX information for DRX operation based on DRX cycles having an on-duration and an off-duration; determining, when semi-persistent resources are allocated, an offset of the DRX cycles so that the time of semi-persistent resource allocation belongs to the on-duration of one DRX cycle; checking whether a packet is successfully received through the allocated semi-persistent resources; and performing, when a packet is successfully received, DRX operation according to the received DRX information and determined offset. The discontinuous reception apparatus performs discontinuous reception using the method.

12 Claims, 7 Drawing Sheets

METHOD AND APPARATUS FOR DISCONTINUOUS RECEPTION IN MOBILE TERMINAL

TECHNICAL FIELD

The present invention relates to discontinuous reception in a mobile terminal and, more particularly, to a method and apparatus for discontinuous reception (DRX) in a mobile terminal wherein the on-durations of DRX cycles are assigned according to allocation of semi-persistent resources during DRX operation of the mobile terminal.

BACKGROUND ART

Universal Mobile Telecommunications System (UMTS) refers to a third-generation asynchronous mobile communication system that employs Wideband Code Division Multiple Access (WCDMA) on the basis of Global System for Mobile Communications (GSM) and General Packet Radio Service (GPRS) used primarily in Europe.

The 3GPP (3rd Generation Partnership Project), the UMTS standardization body, has proposed Long Term Evolution (LTE) as next generation mobile communication technology for the UMTS system. The LTE system is based on high-speed packet-based communication technology supporting a maximum data transfer rate of about 100 Mbps, and is expected to be commercially available by about 2010. To achieve this, various approaches have been considered, such as reducing the number of nodes on a communication path and reducing the number of protocol layers supporting wireless channels through simplification of the network architecture.

Particularly in LTE, when resource allocation is conducted through packet-based scheduling and communication is performed using newly allocated resources, heavy traffic may be induced by frequent transmission of control information including scheduling requests and resource allocation indications. To avoid this, semi-persistent scheduling (SPS) has been employed to allocate semi-persistent resources.

A mobile terminal (or user equipment) may reduce power consumption through discontinuous reception (DRX). When DRX operation is enabled, the receiver of the mobile terminal is turned on to receive data during a preset duration and is turned off during the remainder of the time. DRX operation is defined by DRX cycles, and each DRX cycle is composed of an on-duration during which the receiver is turned on and an off-duration during which the receiver is turned off.

However, as it is impossible to allocate semi-persistent resources during the off-duration, even if resources allocatable as semi-persistent resources are available in the off-duration, the base station may be forced to postpone semi-persistent resource allocation until the on-duration of the next DRX cycle. In a worst case scenario, when resources allocatable as semi-persistent resources are not available in the on-duration, the base station may be unable to allocate semi-persistent resources to the mobile terminal even though resources are available in the off-duration, causing service interruption.

DISCLOSURE

Technical Problem

The present invention has been made in view of the above problems, and the present invention provides a method and apparatus for discontinuous reception (DRX) in a mobile terminal wherein assignment of the on-durations is associated with allocation of semi-persistent resources for more efficient resource allocation during DRX operation of the mobile terminal.

Technical Solution

In accordance with an exemplary embodiment of the present invention, there is provided a method for discontinuous reception (DRX) in a mobile terminal, including: receiving DRX information for DRX operation based on DRX cycles having an on-duration and an off-duration; determining, when semi-persistent resources are allocated, an offset of the DRX cycles so that the time of semi-persistent resource allocation belongs to the on-duration of one DRX cycle; checking whether a packet is successfully received through the allocated semi-persistent resources; and performing, when a packet is successfully received, DRX operation according to the received DRX information and determined offset.

Performing DRX operation may include computing DRX starting points on the basis of the determined offset and the received DRX information, and conducting DRX operation from the computed DRX starting points according to the DRX information.

The DRX information may include a DRX cycle length and an on-duration length.

The offset may correspond to the reception time of a semi-persistent resource allocation message.

Alternatively, the offset may correspond to the time ahead or behind by at least one sub-frame time from reception of the semi-persistent resource allocation message.

In accordance with another exemplary embodiment of the present invention, there is provided an apparatus for discontinuous reception (DRX) in a mobile terminal, including: a radio resource controller receiving DRX information for DRX operation based on DRX cycles having an on-duration and an off-duration; and a DRX controller determining, when semi-persistent resources are allocated, an offset of the DRX cycles so that the time of semi-persistent resource allocation belongs to the on-duration of one DRX cycle, and performing, when a packet is successfully received through allocated semi-persistent resources, DRX operation according to the received DRX information and determined offset.

The DRX controller may compute DRX starting points on the basis of the determined offset and the received DRX information, and conduct DRX operation from the computed DRX starting points according to the DRX information.

The DRX information may include a DRX cycle length and an on-duration length.

The DRX controller may determine the offset so that the offset corresponds to one of the reception time of a semi-persistent resource allocation message, the time ahead by at least one sub-frame time from reception of the semi-persistent resource allocation message, and the time behind by at least one sub-frame time from reception of the semi-persistent resource allocation message.

Advantageous Effects

In a feature of the present invention, the start time of DRX operation is determined when a packet is successfully received through newly allocated semi-persistent resources. Hence, assignment of the on-durations of DRX cycles can be associated with allocation of semi-persistent resources, increasing efficiency in utilization of radio resources of the mobile terminal.

DESCRIPTION OF DRAWINGS

The objects, features and advantages of the present invention will be more apparent from the following detailed description in conjunction with the accompanying drawings, in which.

BEST MODE

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

Figure 1:
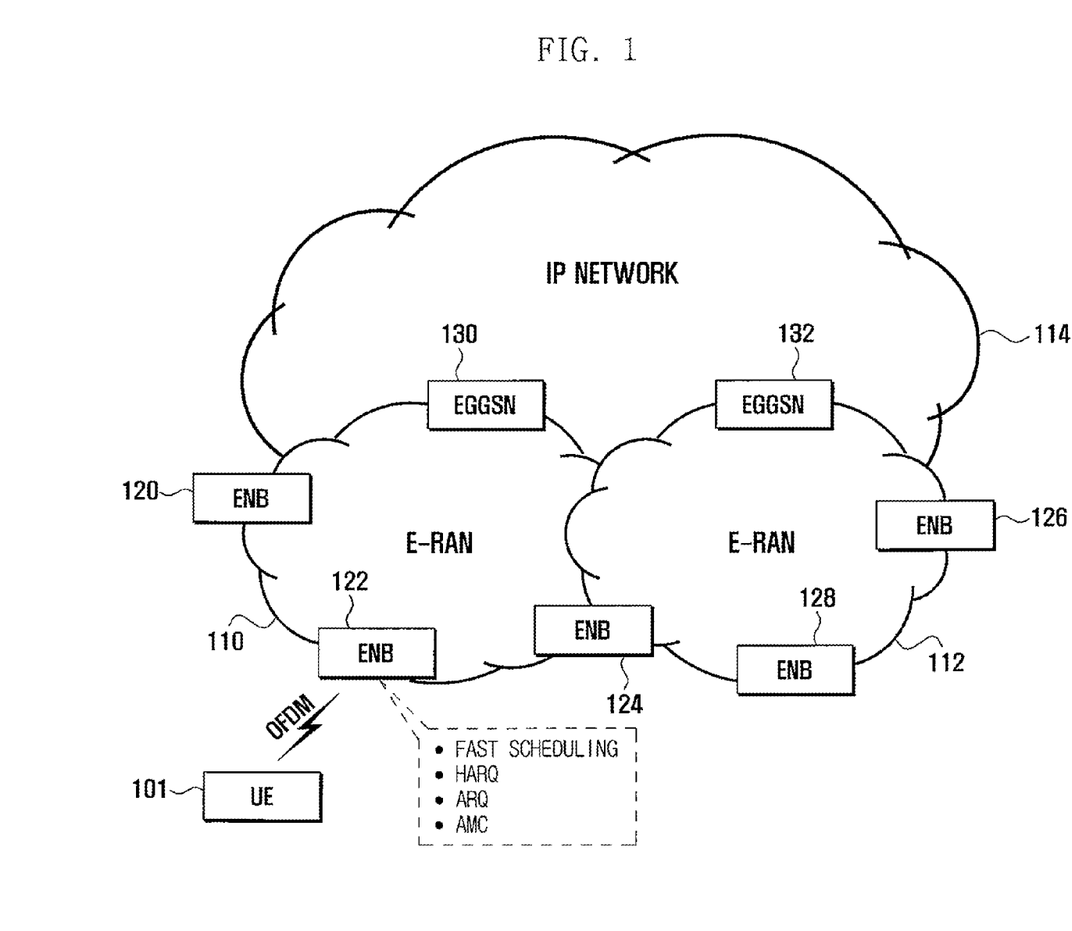
FIG. 1 illustrates an architecture model of a wireless communication system according to the present invention.

First, a brief description is given of a wireless communication system according to the present invention. FIG. 1 illustrates an architecture model of the wireless communication system according to the present invention.

Referring to FIG. 1, an Evolved Radio Access Network (E-RAN) 110 or 112 includes two types of nodes: Evolved Node B (ENB) 120, 122, 124, 126 or 128 and Evolved Gateway GPRS Serving Node (EGGSN) 130 or 132. Here, GPRS stands for General Packet Radio Service.

A user equipment (UE) 101 connects to an Internet Protocol (IP) network 114 through the E-RAN 110 or 112. The ENB 120, 122, 124, 126 or 128 is a node corresponding to an existing NodeB, and may be connected to the user equipment 101 through a wireless channel. Compared with the existing NodeB, the ENB 120, 122, 124, 126 or 128 performs more complex processing. In a next generation wireless communication system, all user traffic including real-time services, such as a VoIP (Voice over IP) service, will be served through shared channels. Such a system may require entities for scheduling individual user equipments using collected situational information, and the ENB 120, 122, 124, 126 or 128 performs these scheduling operations. The ENB 120, 122, 124, 126 or 128 may control a plurality of cells. To achieve a maximum data transfer rate of 100 Mbps, Orthogonal Frequency Division Multiplexing (OFDM) with channel bandwidths of 20 MHz is employed as radio access technology for the system. In addition, adaptive modulation and coding (AMC) may be applied to determine the modulation scheme and channel coding rate according to the channels status of the user equipment 101.

In the following description, the E-RAN 110 or 112 including the ENB 120, 122, 124, 126 or 128 and the EGGSN 130 or 132 is referred to as a base station (indicated by reference symbol 200), and the user equipment 101 is referred to as a mobile terminal (indicated by reference symbol 100).

Figure 2:
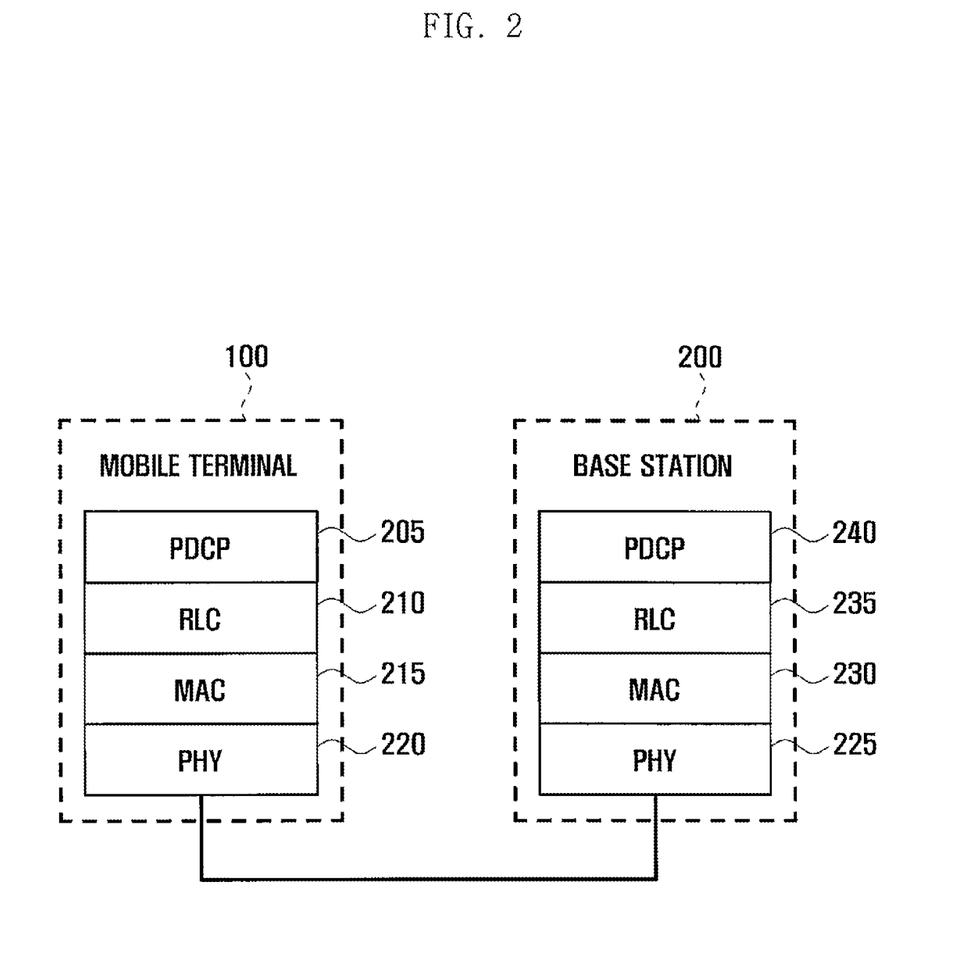
FIG. 2 illustrates a suite of wireless protocols in the wireless communication system.

Next, a description is given of a protocol suite used in the wireless communication system. FIG. 2 illustrates a suite of wireless protocols in the wireless communication system.

Referring to FIG. 2, the wireless protocol suite includes a Packet Data Convergence Protocol (PDCP) 205 and 240, Radio Link Control (RLC) 210 and 235, Medium Access Control (MAC) 215 and 230, and Physical Layer (PHY) 220 and 225.

The PDCP 205 and 240 performs IP header compression and decompression. The RLC protocol 210 and 235 performs segmentation and concatenation of PDCP PDUs and is responsible for Automatic Repeat request (ARQ) operations. Here, a PDU (protocol data unit) of a protocol layer is the output of that layer.

The MAC layer 215 and 230 may be connected with multiple RLC layer entities in a single terminal. The MAC layer 215 and 230 multiplexes RLC PDUs from the RLC layer entities into MAC PDUs, and demultiplexer MAC PDUs into RLC PDUs.

The Physical Layer 220 and 225 converts data from higher layers into OFDM symbols by means of channel coding and modulation and sends the OFDM symbols through a wireless channel, and converts OFDM symbols received through a wireless channel into data by means of demodulation and channel decoding and delivers the data to higher layers.

According to an embodiment of the present invention, the wireless communication system may provide all services on the basis of packets. For example, even a voice call service may be provided through packet switching instead of circuit switching. Particularly, VoIP traffic is composed of short packets that are generated at regular intervals for a specific time. For example, a VoIP service based on the 12.2 kbps AMR codec may generate a packet of about 35 bytes every 20 milliseconds. To support such a VoIP service through regular scheduling, transmission of scheduling request information and transmission of resource allocation information in the reverse direction are required whenever a single VoIP packet is generated. Hence, to reduce network traffic due to transmission of scheduling request information and resource allocation information, the base station 200 may allocate semi-persistent resources to the mobile terminal 100. The mobile terminal 100 may receive a fixed-size packet using allocated semi-persistent resources according to a specified cycle.

The mobile terminal may use discontinuous reception (DRX) to reduce power consumption. That is, when DRX operation is enabled, the receiver of the mobile terminal is turned on for a preset duration and is turned off for the remainder of the time. However, when allocation of semi-persistent resources is not associated with the on-duration of the DRX cycle, the mobile terminal may have to turn on the receiver to receive data at the time of semi-persistent resource allocation. This causes the on-duration of the DRX cycle to increase, reducing the effectiveness of DRX operation. Accordingly, in an embodiment of the present invention, to associate the on-duration of the DRX cycle with semi-persistent resource allocation, an offset is computed to determine the DRX start point on the basis of the time of semi-persistent resource allocation.

Semi-persistent resource allocation is initiated by transmission of a semi-persistent resource allocation message to the mobile terminal. As the semi-persistent resource allocation message is protected by a 16-bit CRC value, an error may occur in CRC operation. That is, the possibility of an error related to the semi-persistent resource allocation message cannot be ignored. On the other hand, a packet transmitted through semi-persistent resources is protected by both a 24-bit CRC value and a HARQ (hybrid automatic repeat request) procedure. Hence, the possibility of an error related to a packet transmitted through semi-persistent resources may be sufficiently small to be ignored. Accordingly, in an embodiment of the present invention, DRX operation starts when a packet is successfully received through allocated semi-persistent resources.

Figure 3:
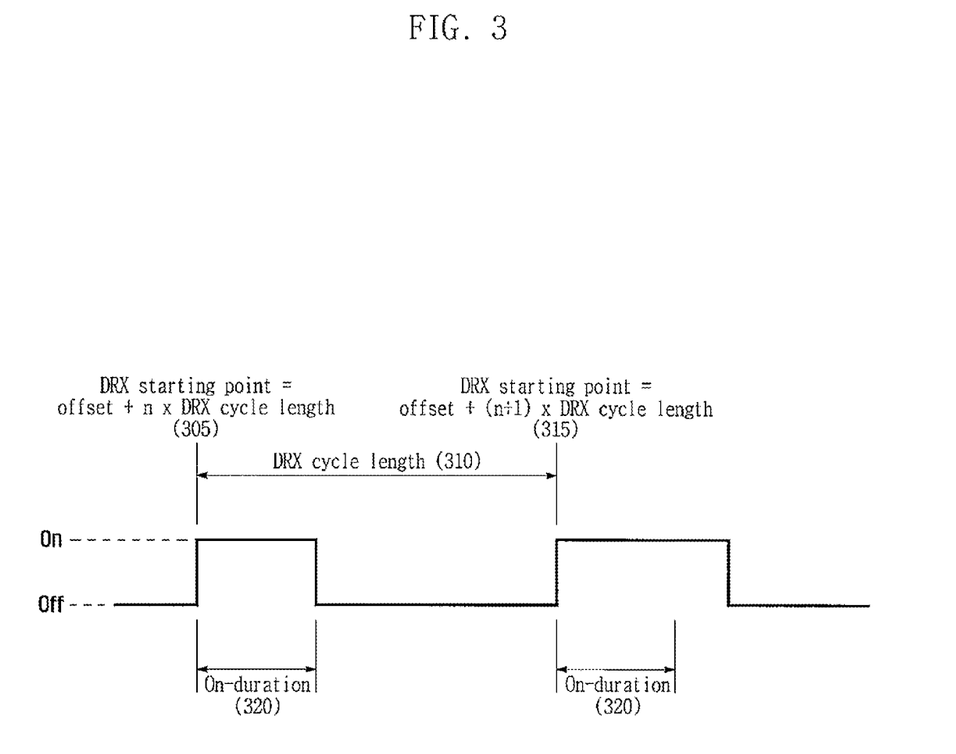
FIG. 3 illustrates a DRX cycle for DRX operation according to an exemplary embodiment of the present invention.

Next, the above schemes are described in more detail. First, DRX operation is described in terms of DRX parameters and DRX starting point. FIG. 3 illustrates a DRX cycle for DRX operation according to an exemplary embodiment of the present invention.

As shown in FIG. 3, DRX operation indicates that the receiver of the mobile terminal 100 is turned on to receive data during a preset duration and is turned off for the remainder of the time in each DRX cycle. In FIG. 3, the receiver of the mobile terminal 100 is turned on in the 'on' state and turned off in the 'off' state.

DRX operation may be specified by repetitive DRX cycles, and each DRX cycle is composed of an on-duration during which the receiver is turned on and an off-duration during which the receiver is turned off. DRX operation may be controlled by DRX parameters, and the DRX parameters may include an offset, DRX cycle length, and on-duration length.

In an embodiment, when the base station 200 allocates semi-persistent resources to the mobile terminal 100, the mobile terminal 100 computes the offset according to the allocated semi-persistent resources. The DRX cycle length and on-duration length are provided by the base station 200 to the mobile terminal 100 as DRX information.

The offset is a parameter used to determine the DRX starting point 305 or 315. The DRX cycle length is a parameter indicating the length of the DRX cycle, and a longer DRX cycle length may indicate a higher possibility of power consumption. The on-duration 320 indicates the minimum duration during which the receiver of the mobile terminal 100 has to be turned on in the DRX cycle. The mobile terminal 100 turns on its receiver at the DRX starting point and keeps the receiver on for at least the on-duration 320, and may sustain the receiver turned on after expiration of the on-duration 320 according to data demand.

The offset, DRX cycle length and on-duration length are expressed in the cell-specific system frame number (SFN) and sub-frame number. The system frame number corresponds to a counter incremented every 10 milliseconds, and has a value between 0 and 4095. The sub-frame number corresponds to a counter incremented every millisecond, and has a value between 0 and 9.

The DRX starting point may be obtained by Equation 1.

$$DRX \text{ starting point} = \text{offset} + n \times DRX \text{ cycle length } (n: \text{integer}) \quad \text{Equation 1}$$

For example, referring to Equation 1, assume that the mobile terminal 100 has obtained an offset of 100 and the base station 200 has provided a DRX cycle length of 1000 to the mobile terminal 100. Then, the mobile terminal 100 may obtain 100, 1100, 2100, 3100, 4100, 5100, 6100 and so on as values of the DRX starting point. As the unit of DRX starting points is one millisecond, the integer quotient of a DRX starting point value divided by 10 corresponds to SFN and the remainder corresponds to the sub-frame number. For instance, a DRX starting point of 1100 indicates sub-frame 0 of SFN 110.

In an embodiment, the DRX starting point is obtained using the time of semi-persistent resource allocation. Hence, the offset is determined at the time of semi-persistent resource allocation. The present invention relates to a method and apparatus that can relax scheduling restrictions caused by allocation of semi-persistent resources after initiation of DRX operation. Once DRX operation is initiated, semi-persistent resources can only be allocated during the on-duration of the DRX cycle. This causes scheduling restrictions. Accordingly, in the present invention, DRX operation is started after semi-persistent resources are allocated. That is, the DRX starting point may be associated with semi-persistent resource allocation. Further, in the case where semi-persistent resources are allocated, the mobile terminal 100 starts DRX operation after at least one packet is successfully received through the allocated semi-persistent resources. This serves to prevent an error in calculation of the DRX starting point caused by reception of an erroneous semi-persistent resource allocation message. When the mobile terminal 100 receives a semi-persistent resource allocation message that is destined for another mobile terminal as a normal semi-persistent resource allocation message owing to a CRC operation error, the semi-persistent resource allocation message may be regarded as erroneous (namely, the semi-persistent resource allocation message has an unrecognized error).

Figure 4:
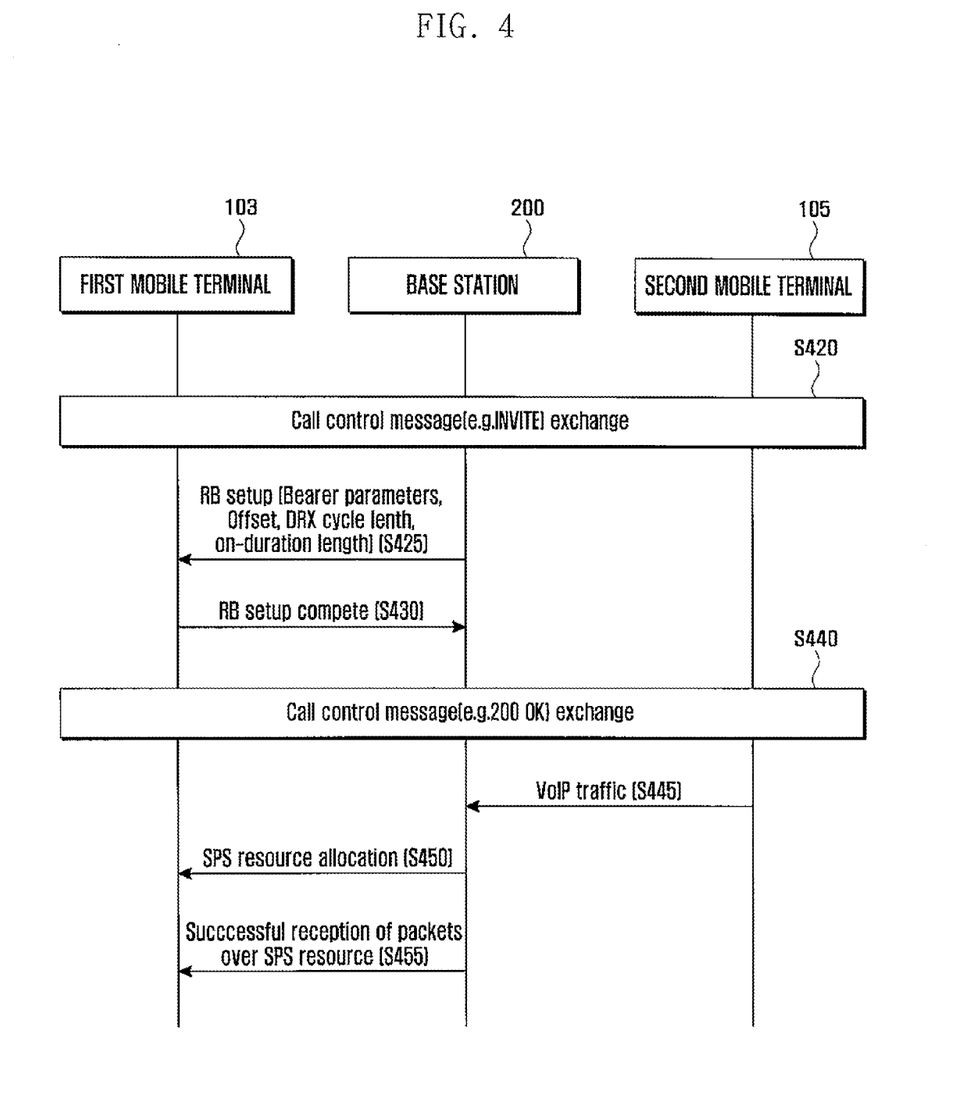
FIG. 4 is a diagram illustrating exchange of messages for DRX operation.

Next, a more detailed description is given of DRX operation. FIG. 4 is a diagram illustrating exchange of messages for DRX operation.

In FIG. 4, it is assumed that a first mobile terminal 103 is a sending terminal and a second mobile terminal 105 is a receiving terminal.

The first mobile terminal 103 initiates call setup with the second mobile terminal 105 by exchanging call setup control messages through the base station 200 (S420). Thereafter, the first mobile terminal 103 and second mobile terminal 105 complete call setup (S440).

Here, call setup may be related to a call over VoIP. For example, for call setup according to the session initiation protocol (SIP), the first mobile terminal 103 sends an INVITE message to the second mobile terminal 105 through the base station 200 at step S420; and the second mobile terminal 105 sends a "200 OK" message to the first mobile terminal 103 through the base station 200 at step S440. The first mobile terminal 103 and second mobile terminal 105 may negotiate QoS (quality of service) parameters for the call during call setup. The negotiated QoS parameters are provided to the base station 200.

During call setup (between step S420 and step S440), after the negotiated QoS parameters are received by the base station 200, the base station 200 and the first mobile terminal 103 exchange RRC (radio resource control) messages. The RRC messages include an RB (radio bearer) setup message that is sent by the base station 200 to the first mobile terminal 103 at step S425, and an RB setup complete message that is sent by the first mobile terminal 103 to the base station 200 at step S430. Here, the RB setup message may carry multiple bearer parameters and other parameters such as an offset, DRX cycle length and on-duration length.

After completion of call setup between the first mobile terminal 103 and the second mobile terminal 105, when VoIP traffic related to the call is generated (S445), the base station 200 allocates semi-persistent resources (SPS resources) to the first mobile terminal 103 (S450).

After allocation of the semi-persistent resources, the first mobile terminal 103 determines the offset, which is a parameter for determining the DRX starting point. Thereafter, when the first mobile terminal 103 receives a packet through the allocated semi-persistent resources (S455), it determines the DRX starting point and starts DRX operation.

Figure 5:
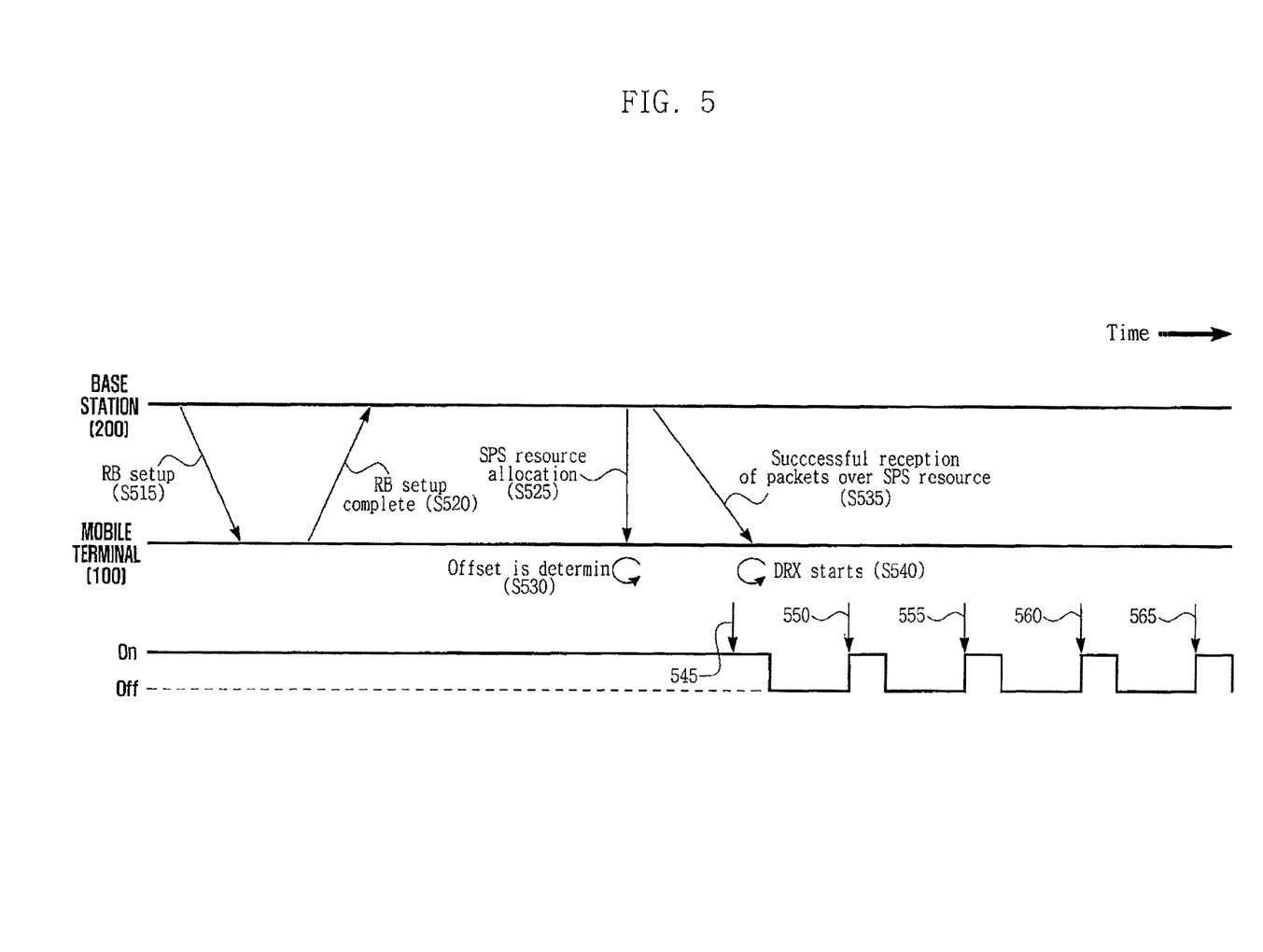
FIG. 5 is a diagram illustrating timing relationship for DRX operation.

Next, a description is given of DRX parameter setting. FIG. 5 is a diagram illustrating timing relationship for DRX operation.

In FIG. 5, the receiver of the mobile terminal 100 is turned on in the 'on' state and turned off in the 'off' state. In one embodiment, the mobile terminal 100 awaits semi-persistent resource allocation with the receiver turned on. That is, the mobile terminal 100 keeps the receiver turned on until initiation of DRX operation.

Referring to FIG. 5, the mobile terminal 100 receives an RB setup message carrying DRX parameters from the base station 200 and stores the DRX parameters (S515). As described before, the DRX parameters include an offset, DRX cycle length and on-duration length. As the offset is determined at the time of semi-persistent resource allocation, the mobile terminal 100 does not use the offset at step S515.

The mobile terminal 100 may receive DRX parameters through the RB setup message during RB setup in the call setup procedure. After storing DRX parameters and completing RB setup, the mobile terminal 100 sends an RB setup complete message to the base station 200 (S520).

As transmission of an RRC message such as an RB setup message or RB setup complete message may entail a HARQ procedure, a transmission delay of several to several dozen milliseconds may be encountered. In FIG. 5, a diagonal arrow indicates the transmission delay of the corresponding message.

A standard mobile terminal starts DRX operation immediately after an RB setup message carrying DRX parameters is received or an RB setup complete message is sent in response to the RB setup message. On the other hand, the mobile terminal 100 of the present invention does not start DRX operation even after an RB setup complete message is sent in response to reception of an RB setup message carrying DRX parameters.

When the mobile terminal 100 receives a semi-persistent resource allocation message (S525), it determines the offset using a preset rule with reference to the time of reception of the semi-persistent resource allocation message (S530). For example, the offset may be set to the time of reception of the semi-persistent resource allocation message. Alternatively, the offset may be set to n sub-frame times before or after reception of the semi-persistent resource allocation message.

Further, the mobile terminal 100 does not start DRX operation immediately after determination of the offset and postpones DRX operation until at least one packet is successfully received through the allocated semi-persistent resources. This prevents adverse effects caused by reception of a semi-persistent resource allocation message having an unrecognized error.

As described before, as the semi-persistent resource allocation message is protected by a 16-bit CRC value, an error may occur in CRC operation. That is, the possibility of an unrecognized error cannot be ignored. On the other hand, a packet transmitted through semi-persistent resources is protected by both a 24-bit CRC value and a HARQ procedure. Hence, the possibility of an unrecognized error related to a packet may be sufficiently small to be ignored.

Accordingly, when a packet is successfully received through the allocated semi-persistent resources (S535), the mobile terminal 100 starts DRX operation (S540).

DRX operation is specified by the offset determined at step S530 using the received semi-persistent resource allocation message, and the DRX cycle length and on-duration length carried by the received RB setup message at step S515. That is, the mobile terminal 100 computes DRX starting points using the offset and the DRX cycle length, turns on the receiver at each DRX starting point and keeps the receiver on for at least the on-duration.

In FIG. 5, assume that reference symbol 545 indicates the initial DRX starting point. In this case, the receiver is already turned on at the initial DRX starting point 545. Hence, in the first DRX cycle, the mobile terminal 100 keeps the receiver on for the on-duration, turns the receiver off at the end of the on-duration and keeps the receiver off for the off-duration (until the next DRX starting point 550). This process is repeated as indicated by reference symbols 555, 560 and 565.

Figure 6:
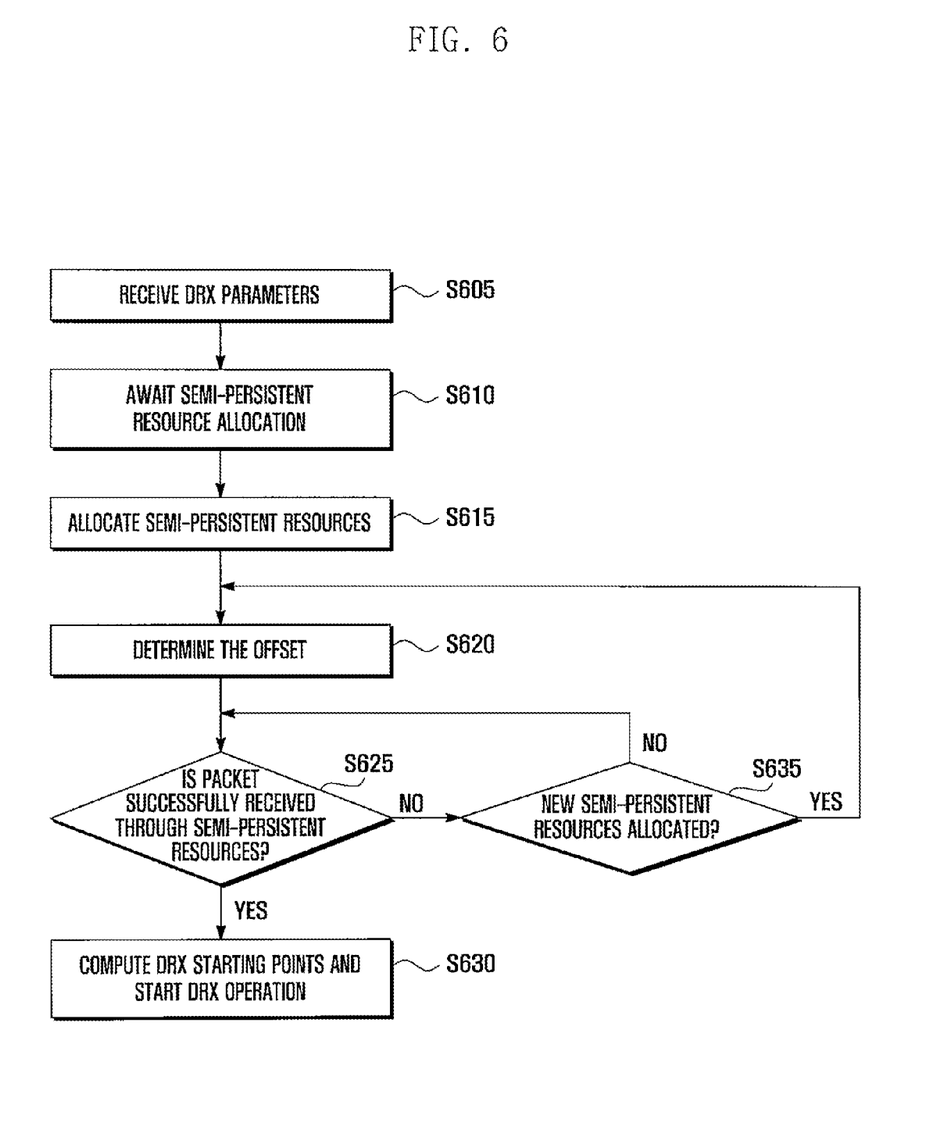
FIG. 6 is a flow chart of a DRX operation method for a mobile terminal according to another exemplary embodiment of the present invention.

Next, a description is given of setting DRX operation. FIG. 6 is a flow chart of a DRX operation method for the mobile terminal 100 according to another exemplary embodiment of the present invention.

Referring to FIG. 6 together with FIGS. 4 and 5, the mobile terminal 100 receives DRX information and stores the received DRX information (S605). The DRX information includes a DRX cycle length and on-duration length.

The mobile terminal 100 awaits semi-persistent resource allocation with the receiver turned on (S610).

When semi-persistent resources are allocated (S615), the mobile terminal 100 determines the offset (S620). Here, the offset is determined using a preset rule with reference to the time of reception of a semi-persistent resource allocation message. For example, the offset may be set to the time of reception of the semi-persistent resource allocation message. Alternatively, the offset may be set to n sub-frame times before or after reception of the semi-persistent resource allocation message.

After determining the offset, the mobile terminal 100 checks whether a packet is successfully received through the allocated semi-persistent resources (S625). That is, the mobile terminal 100 processes a packet received through the allocated semi-persistent resources and verifies successful packet reception through CRC operation.

When a packet is successfully received through the allocated semi-persistent resources (namely, no error is detected through CRC operation), the mobile terminal 100 starts DRX operation using the offset determined at step S620 (S630). That is, the mobile terminal 100 computes DRX starting points using the offset determined at step S620 and the DRX cycle length of the DRX information received at step S605. The mobile terminal 100 determines on-durations and off-durations of DRX cycles using the computed DRX starting points and the on-duration length. In a DRX cycle, the mobile terminal 100 keeps its receiver on for the on-duration and keeps the receiver off for the off-duration. The mobile terminal 100 repeatedly turns on and off according to on-durations and off-durations of DRX cycles beginning from DRX starting points.

Accordingly, as the time of semi-persistent resource allocation belongs to the on-duration of a DRX cycle, the mobile terminal 100 may receive a packet through the semi-persistent resources in each on-duration during DRX operation.

When a packet is not successfully received through the allocated semi-persistent resources at step S625, the mobile terminal 100 determines whether new semi-persistent resources have been allocated (S635).

When new semi-persistent resources have been allocated, the mobile terminal 100 returns to step S620 and re-determines the offset with reference to the reception time of the new semi-persistent resource allocation message.

When new semi-persistent resources have not been allocated, the mobile terminal 100 returns to step S625 and checks whether a packet is successfully received through the existing semi-persistent resources.

Figure 7:
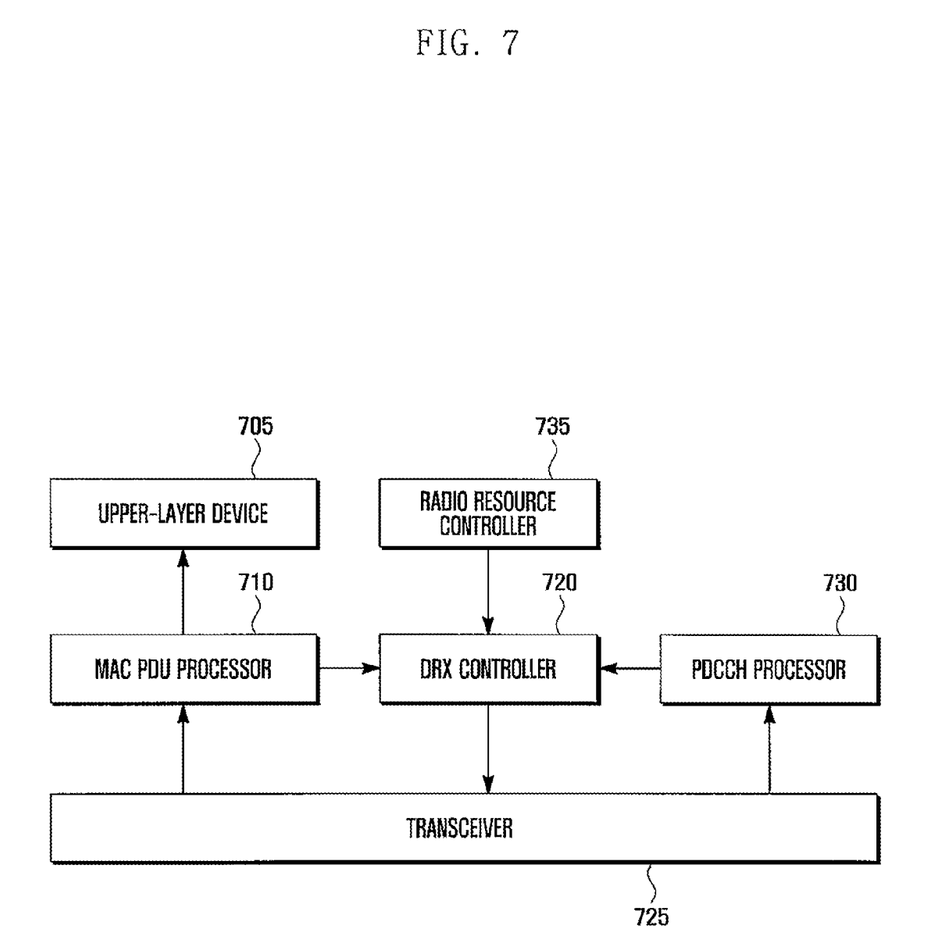
FIG. 7 is a block diagram of a mobile terminal according to another exemplary embodiment of the present invention.

Next, a description is given of the configuration of the mobile terminal 100. FIG. 7 is a block diagram of the mobile terminal 100 according to another exemplary embodiment of the present invention.

Referring to FIG. 7, the mobile terminal 100 includes an upper-layer device 705, a MAC PDU processor 710, a DRX controller 720, a transceiver 725, a PDCCH processor 730, and a radio resource controller 735.

The transceiver 725 is a unit for data transmission and reception through a wireless channel. In particular, the transceiver 725 receives data over a physical downlink control channel (PDCCH). When data is received over the PDCCH, the transceiver 725 decodes the received data and forwards the decoded data to the PDCCH processor 730. Here, the data may correspond to a semi-persistent resource allocation message.

The PDCCH processor 730 performs, upon reception of a decoded semi-persistent resource allocation message from the transceiver 725, a CRC operation by masking the semi-persistent resource allocation message with a C-RNTI (cell radio network temporary identity). The C-RNTI is an identifier that is used to check whether the semi-persistent resource allocation message is destined for the mobile terminal 100. That is, the PDCCH processor 730 may perform a CRC operation to check whether a received message is addressed to the mobile terminal 100. When no error is detected through the CRC operation, the PDCCH processor 730 forwards the semi-persistent resource allocation message to the DRX controller 720.

The DRX controller 720 receives DRX information from the radio resource controller 735 and saves the received DRX information. Here, the DRX information includes DRX parameters such as a DRX cycle length and on-duration length.

When the PDCCH processor 730 notifies reception of a semi-persistent resource allocation message, the DRX controller 720 produces the offset on the basis of the reception time of the semi-persistent resource allocation message.

When a packet is successfully received through the allocated semi-persistent resources, the DRX controller 720 computes DRX starting points using the DRX cycle length, on-duration length and offset, and initiates DRX operation.

The MAC PDU processor 710 processes MAC PDUs from the transceiver 725 and forwards the processed MAC PDUs to the upper-layer device 705. When a MAC PDU is successfully received through semi-persistent resources, the MAC PDU processor 710 notifies the DRX controller 720 of this. The MAC PDU processor 710 converts data output from the upper-layer device 705 into MAC PDUs and forwards the MAC PDUs to the transceiver 725. Here, the size of the MAC PDU is determined according to information contained within the semi-persistent resource allocation message.

The upper-layer device 705 includes an RLC entity and a PDCP entity. The PDCP entity performs IP header compression and decompression. The RLC entity performs segmentation and reassembly of PDCP PDUs to suitable sizes, and performs an ARQ procedure for reliable data transmission.

The radio resource controller 735 receives DRX information from the base station 200 during call setup and forwards the received DRX information to the DRX controller 720.

Although not shown, the mobile terminal 100 of the present invention may further include a storage unit to temporarily or permanently store received data. The storage unit may store DRX information according to one embodiment. The mobile terminal 100 may further include a decoding unit to decode data or messages related to a specific protocol along with the PDCCH processor 730. The decoding unit may be connected to the transceiver 725, and decode data or messages related to the specific protocol among all data and messages received by the transceiver 725.

INDUSTRIAL APPLICABILITY

While exemplary embodiments of the present invention have been shown and described in this specification, it will be understood by those skilled in the art that various changes or modifications of the embodiments are possible without departing from the spirit and scope of the invention as defined by the appended claims.

The invention claimed is:

1. A method for discontinuous reception (DRX) by a mobile terminal, comprising:
   receiving DRX information for DRX operation defined by a DRX cycle having an on-duration and an off-duration;
   determining, if a message for allocation of a semi-persistent resource is received, an offset of the DRX cycles based on the received message for allocation of the semi-persistent resource;
   checking whether a packet is successfully received through the semi-persistent resource;
   identifying a DRX start time at which the on-duration starts based on the determined offset and the DRX information after the packet is successfully received through the semi-persistent resource; and
   performing the DRX operation according to the DRX start time.

2. The method of claim 1, wherein the DRX information comprises a DRX cycle length and an on-duration length.

3. The method of claim 1, wherein the offset corresponds to one of reception time of the message for allocation of the semi-persistent resource, a time ahead by at least one sub-frame time from reception of the message for allocation of the semi-persistent resource, and a time behind by at least one sub-frame time from reception of the message for allocation of the semi-persistent resource.

4. An apparatus for discontinuous reception (DRX) in a mobile terminal, comprising:
   a transceiver configured to receive DRX information for DRX operation defined by a DRX cycle having an on-duration and an off-duration; and
   a controller configured to:
      determine an offset of the DRX cycle based on a message for allocation of a semi-persistent resource if the message for allocation of the semi-persistent resource is received
      check whether a packet is successfully received through the semi-persistent resource,
      identify a DRX start time at which the on-duration starts based on the determined offset and the DRX information after the packet is successfully received through the semi-persistent resource, and
      perform the DRX operation according to the DRX start time.

5. The apparatus of claim 4, wherein the DRX information comprises a DRX cycle length and an on-duration length.

6. The apparatus of claim 4, wherein the controller is further configured to determine the offset so that the offset corresponds to one of reception time of the message for allocation of the semi-persistent resource, a time ahead by at least one sub-frame time from reception of the message for allocation of the semi-persistent resource, and a time behind by at least one sub-frame time from reception of the message for allocation of the semi-persistent resource.

7. The method of claim 1, wherein the determining of the offset of the DRX cycle comprises determining the offset as n sub-frame times before or after reception of the message for allocation of the semi-persistent resource,
wherein n is an arbitrary positive integer.

8. The method of claim 1, wherein the identifying of the DRX start time comprises:
identifying the DRX start time using the equation:

$$\text{the } DRX \text{ start} = n * DRX \text{ cycle length},$$

wherein, n is an arbitrary positive integer.

9. The apparatus of claim 4, wherein the controller determines the offset as n sub-frame times before or after reception of the semi-persistent resource,
wherein, n is an arbitrary positive integer.

10. The apparatus of claim 4, wherein the controller identifies the DRX start time using the following equation:

$$\text{the } DRX \text{ start} = n * DRX \text{ cycle length},$$

wherein, n is an arbitrary positive integer.

11. The method of claim 1, wherein the semi-persistent resource is allocated to the on duration of the DRX cycle.

12. The apparatus of claim 4, wherein the semi-persistent resource is allocated to the on-duration of the DRX cycle.

* * * * *